Aug. 8, 1950  A. G. CHURCH  2,517,842
FLOWER HOLDER
Filed June 23, 1948  2 Sheets-Sheet 1
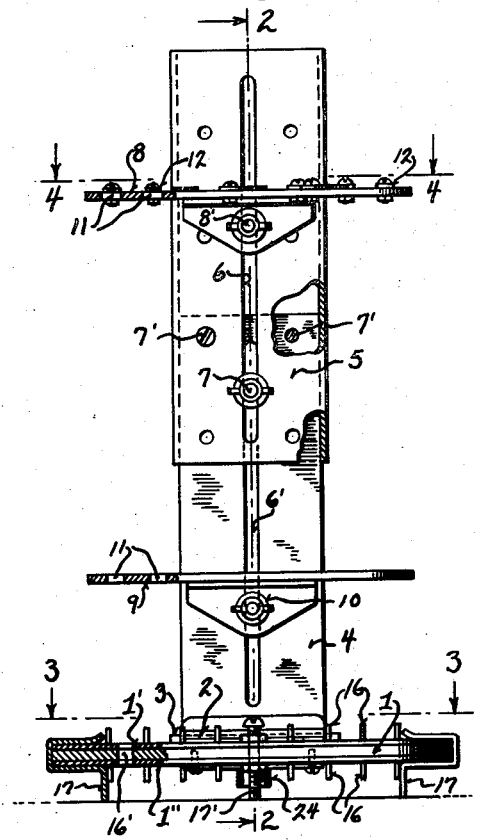
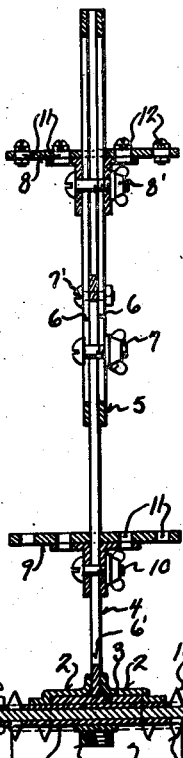
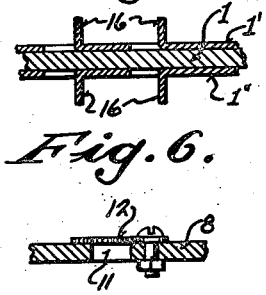
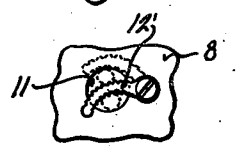
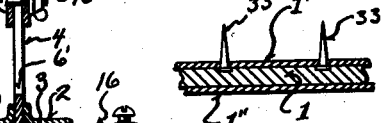
INVENTOR
ARTHUR G. CHURCH
BY
ATTORNEYS Aug. 8, 1950     A. G. CHURCH     2,517,842
FLOWER HOLDER
Filed June 23, 1948     2 Sheets-Sheet 2
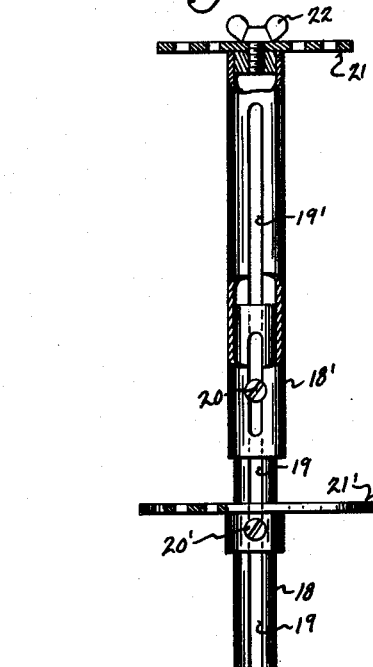
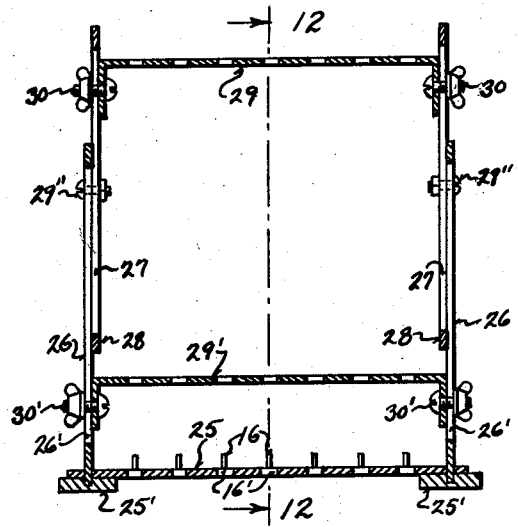
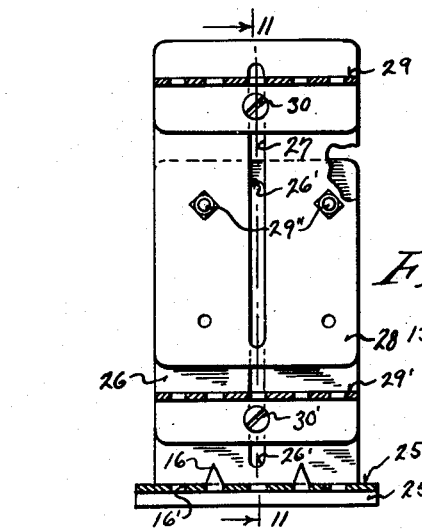
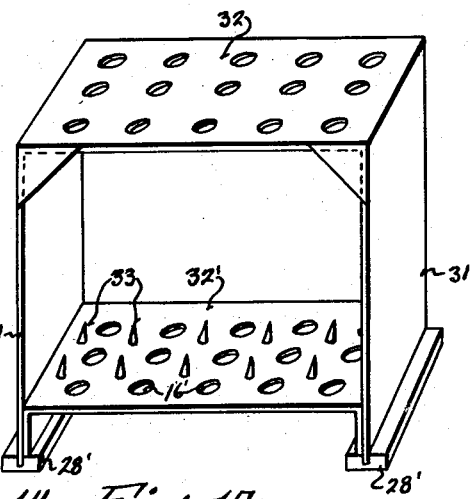
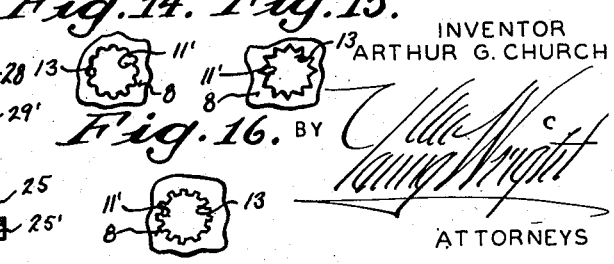
INVENTOR
ARTHUR G. CHURCH
BY
ATTORNEYS Patented Aug. 8, 1950

2,517,842

UNITED STATES PATENT OFFICE 2,517,842

FLOWER HOLDER

Arthur G. Church, Madison, Wis.

Application June 23, 1948, Serial No. 34,618

1 Claim. (Cl. 47—41)

My invention has for its object to provide a simple and effective flower holder, either adjustable or non-adjustable as to height, the same being seated in any type of water container, either deep or shallow.

A specific object of my invention is to provide flower stem holder plates of various outlines, having a series of apertures provided with friction fingers, whereby the flower stems are secured at different elevations.

A further object of my invention is to provide telescopic columns, adjustably locked at different heights.

A still further object of my invention is to provide a reversible base, either oval, square or round in shape, the base being also reversible for attaching different forms of flower supporting columns, such for example, as either a flat or tubular column in telescopic sections, it being understood the flower holder may be fabricated from any suitable material.

A still further object of my invention is to provide the flower receiving apertures in circular form having tooth edges, whereby the stem of the flower may be gripped in its adjusted position.

With the above and other objects in view, which will appear as the description proceeds, the invention resides in the novel construction, combination and arrangement of parts, substantially as hereinafter described, and more particularly defined by the appended claim, it being understood that such changes in the precise embodiment of the herein disclosed invention may be made as come within the scope of the claim.

In the accompanying drawings is illustrated examples of the physical embodiment of the present invention constructed according to the best mode so far devised for the practical application of the principles thereof.

In the drawings:

Figure 1 represents a face view of a flower holder embodying the features of my invention, the parts being broken away and in section to more clearly illustrate structural features.

Figure 2 is a sectional elevation of the same, the section being indicated by line 2—2 of Figure 1.

Figure 3 is a plan sectional view through the holder, the section being indicated by line 3—3 of Figure 1.

Figure 4 is a plan sectional elevation view through the holder, taken upon a plane, as indicated by line 4—4 of Figure 1, the same illustrating one form of gripping fingers associated with the stem apertures of the plate.

Figure 5 is a magnified detail sectional view, through a portion of the base, illustrating stem butt gripping fins, the section being indicated by line 5—5 of Figure 3.

Figure 6 is a fragmentary, detail sectional view through one of the holder plate apertures and gripping fingers, the section being indicated by line 6—6 of Figure 4.

Figure 7 is a detail plan view, illustrating one form of gripping finger associated with a plate aperture.

Figure 8 is a sectional view of another form of stem butt gripping fins.

Figure 9 is a perspective view of another form of column socket.

Figure 10 is a face view of a modified form of flower holder column, wherein the sections are tubular.

Figure 11 is a sectional side elevation of still another form of holder column, the section being taken on line 11—11 of Figure 12.

Figure 12 is a longitudinal, sectional view of the same, the section being indicated by line 12—12 of Figure 11.

Figure 13 is a perspective view of still another type of holder, wherein the columns are connected by a rectangular apertured base having stem gripping fins and an apertured top plate connecting the columns.

Figure 14 to Figure 16, inclusive, illustrate stem apertures wherein the circular edges thereof are formed with different forms of gripping teeth for a stem.

Referring by characters to the drawings, 1 indicates a base formed from inner thick metal, jacketed with thin metal pieces 1' and 1''.

As best indicated in Figures 1 to 3, inclusive, the jacket face 1' of the base carries a slotted shoe 2, into which is fitted the foot 3 of a flower stem holder column section 4, which section is of the sleeve type and is in telescopic union with a hollow column section 5, that is provided with longitudinal slots 6, which are lined with a slot 6' formed in the rectangular column section 4.

The engaged column sections, are locked in their adjusted positions by a screw and thumb nut 7, which passes through the slots, it being noted, however, as best indicated in Figures 1 and 2 of the drawings that said sections may be secured by apertures and bolts 7'.

Adjustably mounted upon the upper column section 5, is a stem holding plate 8, which plate is held in its adjustable position by a bolt and thumb nut 8', that passes through slots of the upper column section 5.

A similar stem holding plate 9, is slidably mounted upon the lower column section 4 and the same is held in its adjusted position by a bolt and thumb nut 10, which passes through slot 6' of said column section.

It will be noted that the upper and lower holding plates are each provided with a series of flower stem holding apertures 11, which apertures are associated with stem gripping fingers 12, the same being pivotally connected to the plates in frictional engagement with the said plate, whereby when said fingers are adjusted upon their pivot with reference to the associated aperture, they will firmly and securely grip and hold the flower stem in its adjusted position and as indicated in Figures 6 and 4 of the drawings, these straight fingers are provided with saw tooth, roughened edges for gripping purposes.

As illustrated in Figure 7 of the drawings, the pivoted gripping finger 12' is curved as to form and obviously, while one of these curved fingers are shown, I may in some instances provide a pair of curved fingers mounted upon each pivot point.

As best indicated in Figures 14 to 16 of the drawings, in some instances I may provide the circular plate apertures 11' with internal, peripheral teeth 13, which teeth may be as shown in the drawings referred to, varied as to design, and said teeth serve to bite into the stem of a flower, when the same is adjusted and fixed in the aperture 11'.

As indicated in Figure 9 of the drawings, I have illustrated a modified form of column socket 14, which socket 14, is provided with winged foot 14', that engages the slotted shoe 2, of the composite supporting base 1.

When the modified form of socket is utilized, the lower column section 4, has eliminated therefrom the foot 3, whereby said lower end of the column is inserted in the socket opening 14", and I may also employ a set screw 15 in connection with this socket, whereby the column and socket joint are fastened together.

As best indicated in Figures 1 to 3, inclusive, the composite base is provided with a series of apertures 16' for seating the butt end of the flower stems therein.

I also provide both faces of this base with pointed, upstanding burrs 16, which burrs may be selectively seated within the butt end of a flower stem, whereby the same is firmly secured.

It should be further understood that when the flower stem is short, it may be directly locked to the upper plate 8 or the lower plate 9.

As illustrated in Figures 1 to 3, inclusive, when the column is in the position shown, in order to clear seating of the base from obstructions, I provide a pair of spring gripped supporting legs 17 for the base and also a pair of adjustable supporting foot bolts 17', whereby the base may be firmly seated by a four point suspension means.

As illustrated in Figure 10 of the drawings, when it is desired, I may provide a tubular standard comprising a lower section 18 and an upper section 18', which sections are in telescopic union, and are provided with slots 19 and 19', for adjusting and securing the same by a thumb nut control bolt 20.

In this assemblage of my invention, the upper apertured stem holding plate 21, is secured to the head of the upper tubular section 18' by a thumb screw 22, and the lower apertured plate 21' is secured by bolt 20', which passes through a sleeve of the plate and the slot 19 of the lower column section.

To mount this tubular column, the lower end is provided with a threaded shank 23, and to attach the reversible composite base to said column, the lower face of said base is provided with an upstanding thimble 24, which thimble, as shown, is in threaded union with the column shank 23, and in this assemblage, the operation of seating the flower stems to the base, is the same as previously described. It is understood also that the holding plates are provided with gripping fingers, not shown, which serve to secure the flower stems in various adjusted positions.

As shown in Figures 11 and 12 of the drawings, I have illustrated another modified form of my flower holder, which is rectangular. In this form the apertured and burred base 25, is provided with weighted end foot rests 25', and extending upwardly therefrom are column sections 26, provided with centrally disposed apertures 26', which register with similar apertures 27, of column sections 28. The upper and lower column sections are secured by bolts 29" that pass through the column apertures as shown.

Upper and lower apertured holding plates 29 and 29' are secured respectively, to the upper and lower column sections, by wing nutted bolts 30 and 30' respectively, which bolts pass through the standard slots, whereby the plates may be adjusted as to elevation, it being understood that said plates also carry some form of stem gripping fingers.

Figure 13 shows still another modified form of my flower holder, wherein the pair of spaced columns 31 extend from foot rests 28' and the top apertured holding plate 32 is an integral part of the columns, it being also understood that in this form of my invention, the lower holding plate 32' is similarly an integral part of the unit. The upper plate is provided with the usual pivoted gripping fingers, not shown, and the lower plate is suitably apertured and provided with piercing burrs 33, which burrs in this assemblage of my invention are in the form of tacks 33, as clearly indicated in Figure 8 of the drawings.

Referring again to Figure 9 of the drawings, the wings 14' of the socket 14, may be flexibly connected to the socket by hinge members, whereby said wings may be folded back upon the socket for shipment.

Thus it should be noted that the stem holding plates are not only adjustable with relation to each other but they are also adjustable relative to the base and, furthermore, the cluster of stems may be transversely shifted back and forth with reference to the base, keeping in mind that the cut butt ends of the stems may be pierced and confined by the series of burrs projecting upwardly from the base.

I claim:

A flower holder comprising a base, a series of flower anchor spurs extending therefrom, a centrally disposed slotted shoe extending upwardly from the base, a foot slidably adjustable in the shoe, a column rectangular in cross section transversely adjustable upon the foot, whereby the flowers are shifted laterally, the column being provided with a longitudinally disposed slot therein, a rectangular sleeve column telescopically mounted upon the first mentioned base column, the same having a longitudinally disposed slot therein in register with the base column slot, a flower stem holding apertured plate adjustably mounted upon the base column, a confining bolt extending through the plate and base column slot, whereby said stem holding plate is adjusted relative to the base, and a second flower stem holding apertured plate adjustably mounted upon the sleeve column and a bolt carried by the said plate extending through the sleeve column slot, whereby said last mentioned stem holding plate is adjusted relative to the lower stem holding plate, the butts of said flower stem being engaged by the base spurs, whereby said flower stems are held at three different points relative to their length.

ARTHUR G. CHURCH.

REFERENCES CITED

The following references are of record in the file of this patent:

UNITED STATES PATENTS

| Number | Name | Date |
| --- | --- | --- |
| 1,989,952 | Thomas | Feb. 5, 1935 |
| 2,021,200 | Placco | Nov. 19, 1935 |
| 2,187,450 | Gebs | Jan. 16, 1940 |

FOREIGN PATENTS

| Number | Country | Date |
| --- | --- | --- |
| 23,881 | Great Britain | A. D. 1911 |